(12) United States Patent
Tsubo

(10) Patent No.: US 6,831,295 B2
(45) Date of Patent: Dec. 14, 2004

(54) TFT-LCD DEVICE HAVING A REDUCED FEED-THROUGH VOLTAGE

(75) Inventor: Yumiko Tsubo, Tokyo (JP)

(73) Assignee: NEC LCD Technologies, Ltd., Kawasaki (JP)

(*) Notice: Subject to any disclaimer, the term of this patent is extended or adjusted under 35 U.S.C. 154(b) by 233 days.

(21) Appl. No.: 10/008,973

(22) Filed: Nov. 8, 2001

(65) Prior Publication Data

US 2002/0057396 A1 May 16, 2002

(30) Foreign Application Priority Data

Nov. 10, 2000 (JP) .......................................... 2000-342844

(51) Int. Cl.[7] ........................ H01L 33/00; G02F 1/1343; G02F 1/136
(52) U.S. Cl. ............................. 257/48; 257/88; 257/91; 349/38; 349/42; 349/44
(58) Field of Search .............................. 349/33, 42, 44, 349/46, 85; 257/88, 48

(56) References Cited

U.S. PATENT DOCUMENTS 5,847,792 A * 12/1998 Kobayashi et al. ......... 349/110
5,953,088 A * 9/1999 Hanazawa et al. .......... 349/110
6,404,466 B1 * 6/2002 Miyahara ..................... 349/48

FOREIGN PATENT DOCUMENTS

| EP | 0555100 | * 11/1993 | ........... G02F/1/136 |
| JP | 06-222392 | 8/1994 | |
| JP | 2000-098427 | 4/2000 | |
| KR | 94-24468 | 11/1994 | |
| KR | 1999-0047242 | 7/1999 | |

* cited by examiner

Primary Examiner—Craig A. Thompson
Assistant Examiner—David L. Hogans
(74) Attorney, Agent, or Firm—Katten Muchin ZavisRosenman

(57) ABSTRACT

A TFT-LCD device has a plurality of scanning lines formed by a first level metallic layer, a plurality of data lines formed by a second level metallic layer, and an array of pixels each having a TFT and a pixel electrode made of a third level ITO layer. Each pixel further includes a shied ring formed by the second level metallic layer for suppressing variance in the parasitic capacitances formed between the pixel electrode and other conductive layers. The suppression of the variance in the parasitic capacitances reduces the feed-through voltage, thereby improving the display performance of the TFT-LCD device.

1 Claim, 15 Drawing Sheets

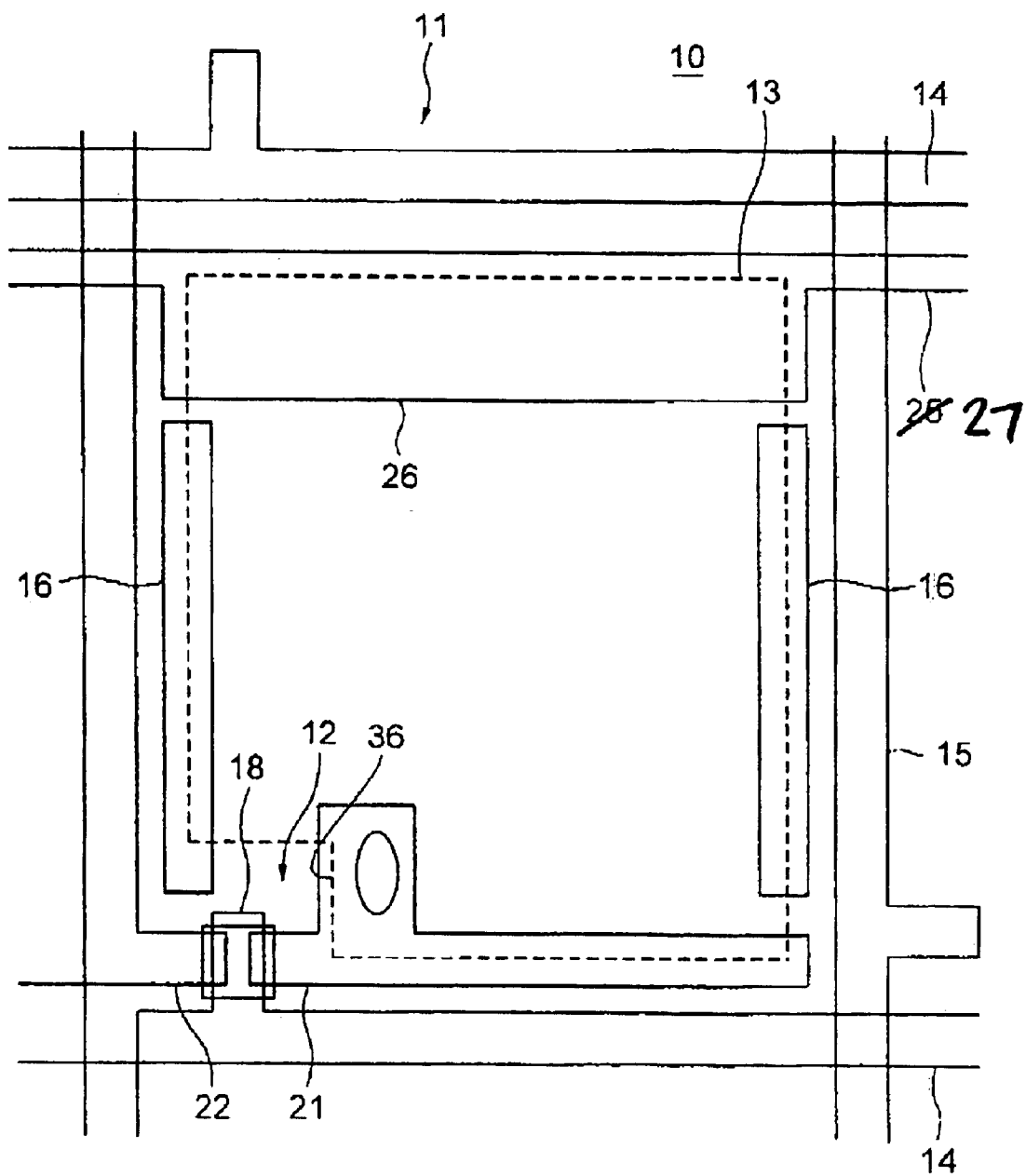

RELATED ART

RELATED ART

TFT-LCD DEVICE HAVING A REDUCED FEED-THROUGH VOLTAGE

BACKGROUND OF THE INVENTION (a) Field of the Invention

The present invention relates to a TFT-LCD (thin-film-transistor liquid-crystal-display) device having a reduce feed-through voltage and, more particularly, to a TFT-LCD device which is capable of reducing variance or scattering in the parasitic capacitances between the pixel electrodes and the signal lines in the TFT-LCD device to reduce the feed-through voltage thereof.

(b) Description of the Related Art

In recent years, LCD devices attract higher attention as the flat display panels which are capable of reducing dimensions thereof and lowering power consumption. In particular, among the LCD devices, TFT-LCD devices are widely used in a variety of office equipment or video display devices due to the advantages thereof wherein gray-scale-level display can be obtained by different driving voltages, and a fine image is obtained thereon with reduced cross-talk between adjacent pixels.

FIG. 1 shows one of the pixels in a conventional active-matrix TFT-LCD device. The TFT-LCD device includes a TFT panel 10 made of glass and mounting thereon a plurality of pixels 11 arranged in an array and each including a TFT (thin film transistor) 12 and an associated pixel electrode 13.

The TFT panel 10 further mounts thereon a plurality of scanning lines 14 each extending in a row direction of the array, a plurality of data lines 15 each extending in a column direction, and a plurality of light-shield members 16 disposed between adjacent pixels for shielding the light passing between the pixels 11. A counter panel (not shown) mounting thereon a counter electrode opposes the TFT panel 10, with a liquid crystal layer sandwiched therebetween. The scanning line 14 has a stripe extension 18 which constitutes a gate electrode of each TFT 12, and a large width expansion 19 opposing the pixel electrode 13 of the adjacent pixel 11 disposed in the next row. The data line 15 has a stripe extension 22 which constitutes a drain of each TFT 12, the source 21 of which is connected to the pixel electrode 13.

The pixel electrode 13 and a corresponding portion of the counter electrode forms a LC capacitance (or LC capacitor), with the liquid crystal layer being a capacitor insulator. The pixel electrode 13 also forms a storage capacitor in association with the large width expansion 19 of the adjacent scanning line 14.

FIG. 2 shows a pixel 11 of another conventional TFT-LCD device which is similar to the pixel 11 of FIG. 2 except for a common line 27 extending adjacent to and parallel to one of the scanning lines 14 and having an expansion 26 instead of the expansion 19 of the scanning line 14 shown in FIG. 1.

In operation of the TFT-LCDs shown in FIGS. 1 and 2, a gray-scale-level voltage is applied between the pixel electrode 13 and the counter electrode to store electric charge on the LC capacitor and the storage capacitor, thereby controlling the electrochemical characteristics of the liquid crystal between the pixel electrode 13 and the counter electrode. This controls the transmission of light through the liquid crystal layer and forms an image pixel by pixel on the LCD panel.

The TFT-LCD has a plurality of parasitic capacitances among the electrodes 13, signal lines 15, and light-shield members 16, in addition to the pixel capacitor and the storage capacitor as described above, due to the complicated arrangement of the electrodes and the signal lines. The parasitic capacitances may vary significantly between the pixels and thus generate variance in the image on the display panel to affect the display performance of the TFT-LCD device.

FIGS. 3A and 3B show schematic views of the TFT-LCD of FIG. 1, for example, for showing the variance in the parasitic capacitances. As shown in the figures, the parasitic capacitances are formed between the pixel electrode 13 (third layer) and the signal lines 15 (second layer) and between the pixel electrode 13 (third layer) and the signal lines 15 as well as the light-shield members 16 (first layer).

The TFT-LCD of FIG. 3A has an ideal alignment between these three layers formed on the TFT panel 10, the ideal alignment providing a symmetry of the parasitic capacitances, such as Cdpi, between the right side and left side of the pixel electrode 13. On the other hand, TFT-LCD of FIG. 3B has a misalignment between three layers on the TFT panel due to the photolithographic process, and thus has an asymmetry of the parasitic capacitances between the right side and the left side of the pixel electrode 13, thereby increasing the feed-through voltage and degrading the display performance of the TFT-LCD device, as detailed below.

It is usual that the polarity of the pixel electrode is reversed with respect to the counter electrode at each frame for suppressing the burning of the LCD panel to improve the display performance. The reversing driving schemes include: a drain line reversing scheme wherein the pixels arranged in the adjacent columns have opposite polarities, with the pixels arranged in the same column having the same polarity, and the pixels in each column are reversed in the polarity thereof at each frame; and a dot reversing scheme wherein every two adjacent pixels have opposite polarities and are reversed in the polarity thereof at each frame.

The potential fluctuation of the data lines is highest at the time of reversion of the polarity thereof to vary the potential of the corresponding pixel electrodes, thereby causing a fluctuation of the brightness of the display. The reversing driving scheme cancels the brightness fluctuation between the adjacent data lines during the polarity reversion.

The amount of the fluctuation canceling may be limited, however, if a significant asymmetry of the parasitic capacitance resides between the adjacent data lines due to the misalignment of the conductive layers as described before. The asymmetry of the parasitic capacitance between the data lines is also caused by the arrangement of the TFT 12 in the pixel, which necessitates a provision of a cutout 36 in the pixel electrode 13 in the vicinity of the data line 15.

Patent Publication JP-A-2000-98427 describes a TFT-LCD device which is capable of alleviating the brightness fluctuation of the LCD panel due to the voltage fluctuation of the data lines. The TFT-LCD device described therein has a symmetry of parasitic capacitance between the right side and the left side of the pixel electrode by equalizing the lengths of the portions of the two adjacent data lines extending parallel to and adjacent to the periphery of the pixel electrode.

In the TFT-LCD device described in JP-A-2000-98427, variance in the parasitic capacitance between the pixel electrode and the first conductive layer is not considered. In addition, the structure of the pixel electrode for equalizing the lengths reduces the effective pixel area for the image.

Patent Publication JP-A-6-222392 describes an active-matrix LCD device which is capable of suppressing variance in the parasitic capacitance between active elements without necessitating a high-accuracy mask alignment. FIG. 4A shows a top plan view of the active matrix LCD device described therein, and FIG. 4B shows a sectional view taken along line B—B in FIG. 4A.

The LCD device has a plurality of pixels 30 arranged in a matrix and each including a square pixel electrode 31, a plurality of scanning electrodes 32 each defining a shape of ladder having a frame section which surrounds a corresponding one of the pixel electrodes 31, and a ring electrode 33 interposed between the pixel electrode 31 and the frame section of the scanning electrode 32. As shown in FIG. 4B, the ring electrode 33 has an inner edge underlying the pixel electrode 31 and an outer edge overlying the frame section of the scanning electrode 32 with an intervention of a dielectric film 34. The pixel electrode 31 is made of a transparent metal oxide (ITO) film which is difficult to pattern with an accurate pattern size, whereby variance in the pattern size of the pixel electrode 31 is relatively large compared to the metallic film.

In the configuration as described above, the scanning electrode 32, the dielectric film 34 and the ring electrode 33 constitute a MIM active element. Even if a misalignment arises between the layers during the photolithographic steps in the fabrication process, the point-symmetric structure of the pixel electrode 31, the ring electrode 33 and the scanning electrode 32 does not cause variance in the parasitic capacitance between the pixels. More specifically, an increase in the parasitic capacitance in the right side or upper side, for example, is cancelled by the decrease in the parasitic capacitance in the left side or lower side, due to the point-symmetric structure.

In the active-matrix LCD device described in JP-A-6-222392, the ring structure of the scanning electrode complicates the structure of the LCD device. In addition, the structure for the active-matrix LCD device cannot be used for the TFT-LCD device as it is.

In the structures shown in FIGS. 1 and 2, the light-shield members 16 formed by the first level layer which is common to the gate electrode 18 causes variance in the parasitic capacitances such as shown in FIGS. 3A and 3B, wherein the display performance of the TFT-LCD device is affected by the parasitic capacitance $C_{GS}$ between the gate and source of the TFT 12, the pixel capacitance (or LC capacitance) $C_{LC}$, storage capacitance $C_{SC}$, the parasitic capacitance Cgpi between the gate and the pixel electrode, and the parasitic capacitance Cdpi between the drain and the pixel electrode, all of which are formed between the different conductive layers and affect the magnitude of the feed-through voltage Vfd.

In the typical TFT-LCD devices, since the transmission factor of the liquid crystal layer depends on the potential difference between the pixel electrode and the counter electrode, the potential Vpi of the pixel electrode should not vary among the pixels in order for achieving a uniform image display on the whole LCD panel. In addition, it is requested that the potential Vpi of the pixel electrode determined by the write operation during the on-state of the TFT be maintained at the same value until the next write operation in the next frame.

However, the parasitic capacitances involved with the pixel electrode affect the potential Vpi of the pixel electrode. Among the factors affecting the potential Vpi, the largest factor is the feed-through voltage Vfd which appears when the gate voltage falls to a low level to turn off the TFT 12 just after the data signal is stored onto the pixel electrode.

The feed-through voltage Vfd is expressed by:

$$Vfd = C_{GS}/\{(C_{GS}+C_{LC}+C_{SC}+Cdpi+Cgpi) \times |V_{Gon}-V_{Gof}|\},$$

wherein $V_{Gon}$ and $V_{Gof}$ are the gate voltage when the TFT is on and the gate voltage when the TFT is off, respectively.

The value defined by $V_{Gon}-V_{Gof}$ is constant among the pixels because the transistor characteristics of the TFTs are generally uniform within the display panel. Accordingly, the feed-through voltage is constant so long as the parasitic capacitances are constant. The influence on the pixel electrode by the feed-through voltage Vfd is such that the potential of the pixel electrode is shifted in one polarity to generate a direct current component irrespective of the polarity of the write voltage applied to the pixel electrode. Thus, in the case as described above, the influence by the feed-through voltage Vfd may be cancelled by shifting the potential of the counter electrode in the same polarity.

However, if the parasitic capacitance varies among the pixel electrodes within the display area, the feed-through voltage Vfd also varies to cause variance in the effective driving voltage applied to the liquid crystal layer even if the potential of the counter electrode is shifted. Thus, the TFT-LCD device has poor display performance such as variance in the brightness in the display area.

The parasitic capacitances are formed between the pixel electrode and the conductive films disposed in the vicinity of the pixel electrode. The pattern sizes of the metallic layers are generally accurate, whereas the pattern size of the ITO layer is generally inaccurate due to the difficulty in the patterning thereof. Thus, if the pattern size of the pixel electrode varies significantly among the pixels within the display area, the parasitic capacitance varies due to the variance in the distance or dimensions, whereby the feed-through voltage varies to degrade the display performance. Thus, it has been long desired to reduce the variance in the parasitic capacitances between the pixel electrode and the other signal lines in order for reducing the feed-through voltage.

SUMMARY OF THE INVENTION

In view of the above, it is an object of the present invention to provide a TFT-LCD device which is capable of suppressing the variance in the brightness among the pixels within the display panel to reduce the feed-through voltage.

The present invention provides a thin-film-transistor liquid-crystal-display (TFT-LCD) device including a plurality of pixels arranged in an array and each including a TFT and an associated pixel electrode made of a transparent material, a plurality of scanning lines each disposed for a row of the pixels for activating the TFTs in the pixels arranged in the corresponding row, a plurality of data lines each disposed for a column of the pixels for supplying data signals via the TFTs to the pixel electrodes in the pixels arranged in the corresponding column, wherein each of the pixels further includes a shield member made of a conductive material, electrically connected to the pixel electrode and extending along a periphery of the pixel electrode.

In accordance with the TFT-LCD device of the present invention, the shield member electrostatically shields the pixel electrode against forming parasitic capacitances between the pixel electrode and signal lines by forming parasitic capacitances between the shield member and the signal lines. This provides a uniform parasitic capacitance between the shield member and the signal lines, and thus reduces the variance in the parasitic capacitances among the pixels caused by the incorrect patterning of the pixel electrodes.

The above and other objects, features and advantages of the present invention will be more apparent from the following description, referring to the accompanying drawings.

BRIEF DESCRIPTION OF THE DRAWINGS

FIG. 2 is a top plan view of TFT panel for showing a pixel of another conventional TFT-LCD device.

PREFERRED EMBODIMENTS OF THE INVENTION

Figure 1:
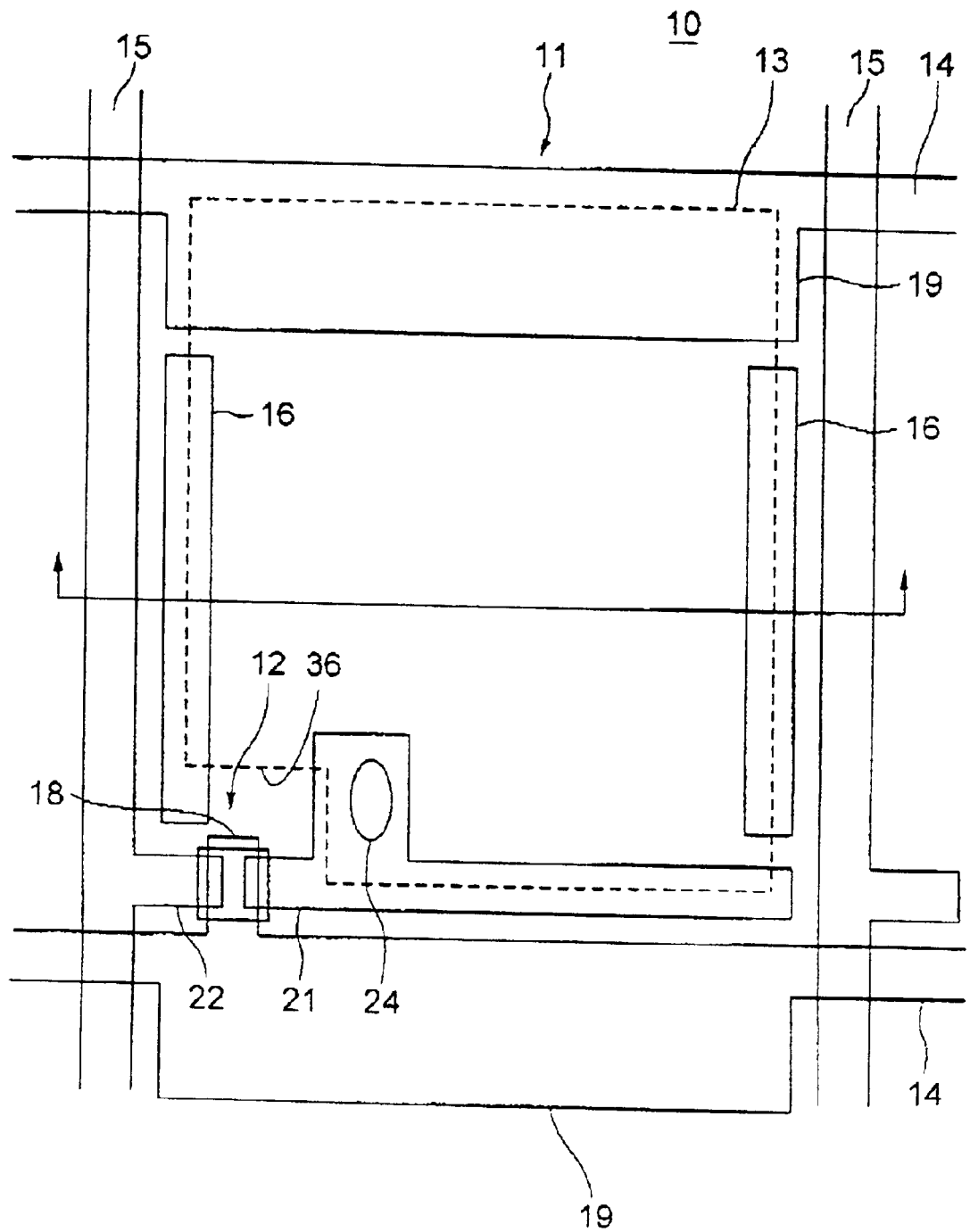
FIG. 1 is a top plan view of a TFT panel for showing a pixel of a conventional TFT-LCD device.
Figure 3A:
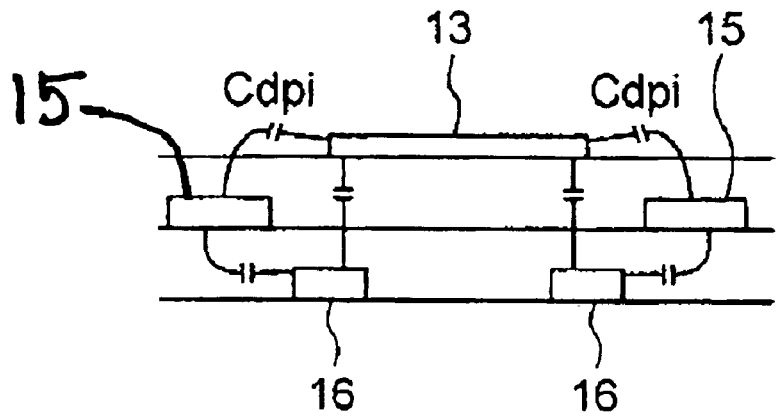
FIGS. 3A and 3B are schematic sectional views of the pixel of FIG. 1 for showing the parasitic capacitances formed in the pixel.
Figure 3B:
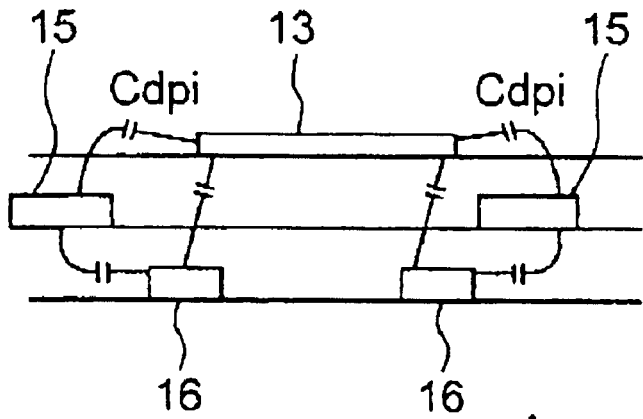
Figure 4A:
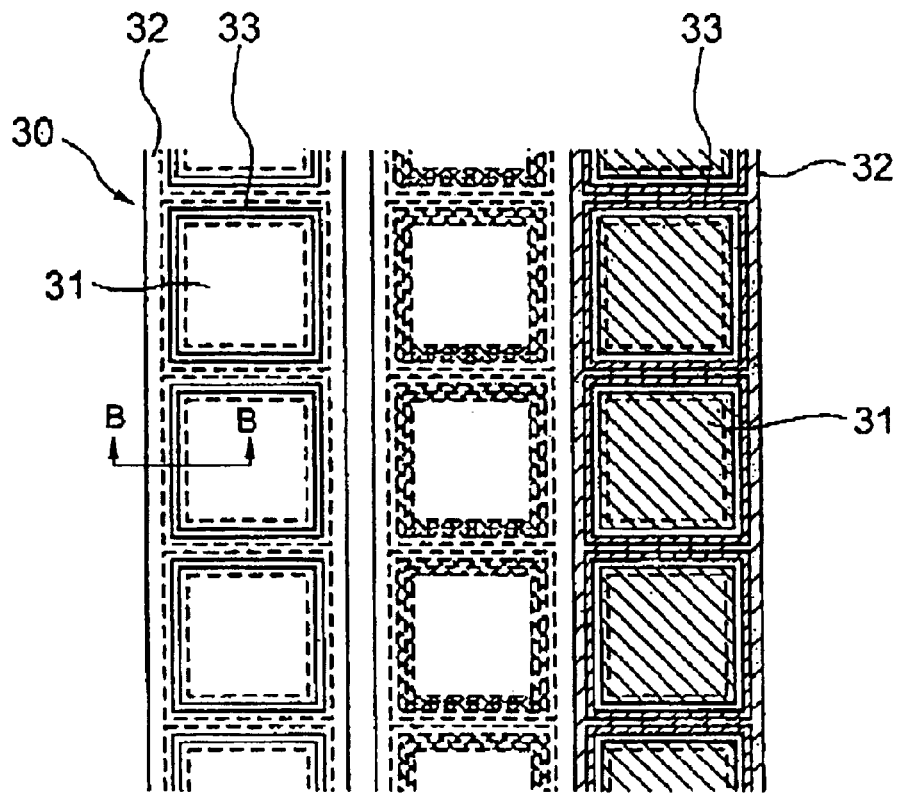
FIG. 4A is a top plan view of a portion of an active matrix panel in a LCD device described in a publication.
Figure 4B:
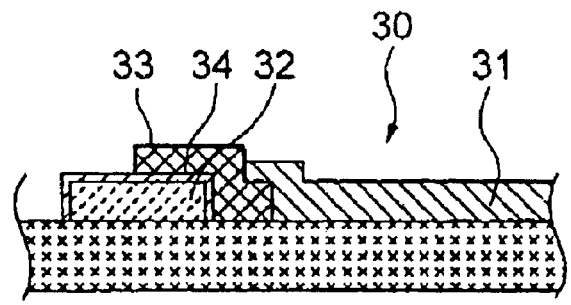
FIG. 4B is a sectional view taken along line B—B in FIG. 4A.

Now, the present invention is more specifically described with reference to accompanying drawings, wherein similar constituent elements are designated by similar reference numerals throughout the drawings. A TFT-LCD device according to a first embodiment of the present invention includes a TFT panel and a counter panel opposing each other, with a liquid crystal (LC) layer sandwiched therebetween.

Figure 5:
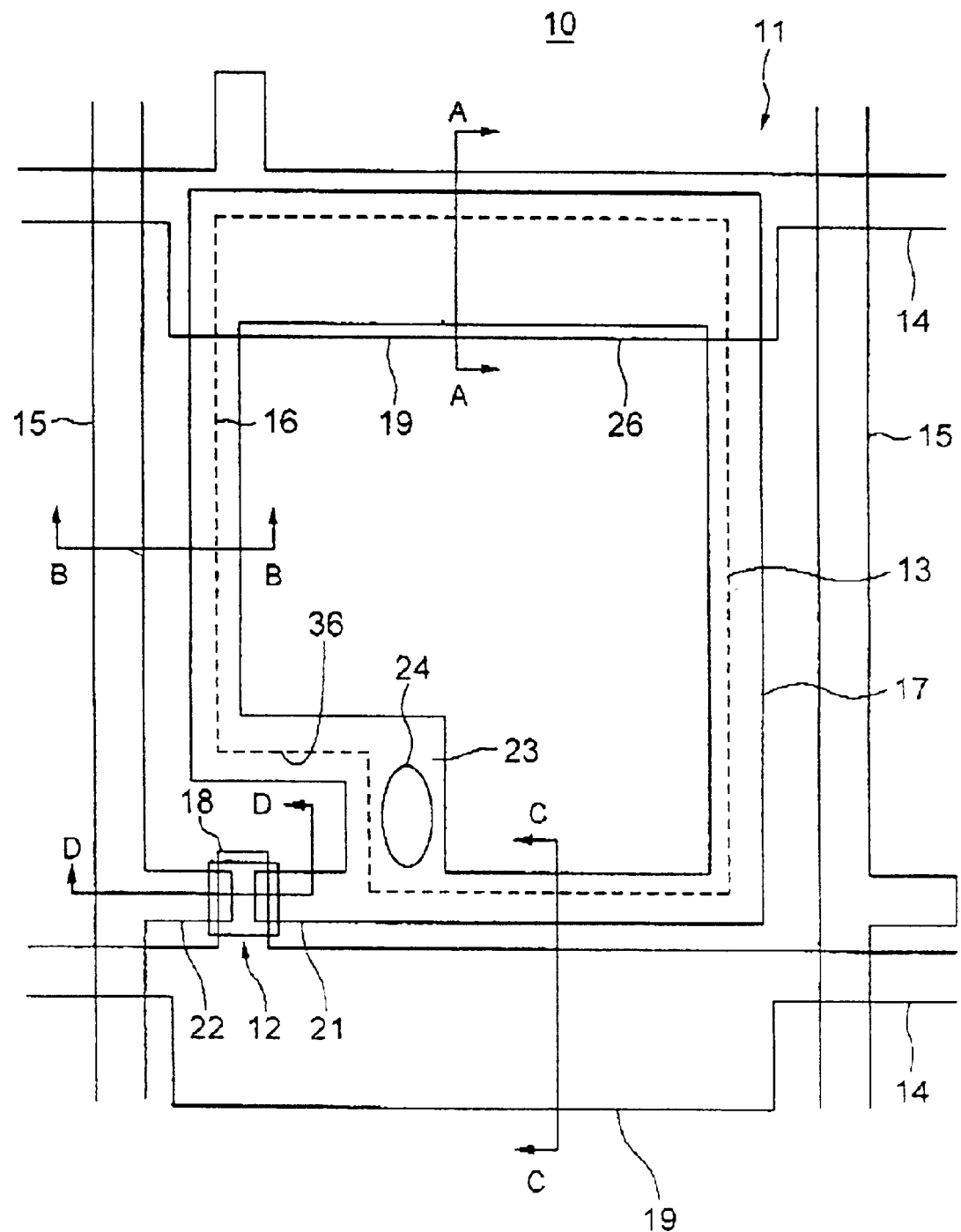
FIG. 5 is a top plan view of a TFT panel for showing a pixel of a TFT-LCD device according to a first embodiment of the present invention.

Referring to FIG. 5, the TFT panel, generally designated by numeral 10, mounts thereon a plurality of pixels 11 arranged in an array or matrix and each including a TFT (thin film transistor) 12 and a pixel electrode 13, and a plurality of scanning lines 14 extending in a row direction of the array, a plurality of data lines 15 extending in a column direction of the array. The pixel 11 also includes a shield ring 17 extending along the periphery of the pixel electrode 13 in the pixel 11.

The layer structure formed on the TFT panel 10 is such that a first conductive layer (or gate layer) includes the scanning lines 14 each having an extension 18 constituting the gate electrode of the TFT 12 and a large width expansion 19 which forms a storage capacitor in association with the pixel electrode 13, a second conductive layer (or source layer) includes source/drain electrodes 21 and 22 of the TFT 12, the data lines 15 and the shield rings 17, and a third conductive layer includes pixel electrodes 13 made of transparent ITO (indium-tin oxide).

The TFT 12 is of a longitudinal type wherein the channel region of the TFT 12 extends parallel to the scanning line 14 and the gate electrode 18 extends normal to the scanning line 14. The shield ring 17 has, in the vicinity of the TFT 12, an expansion 23 which is connected to the pixel electrode 13 via a through-hole 24, and a large width expansion 26 opposing the large width expansion 19 of the scanning line 14 for the next row.

Figure 6A:
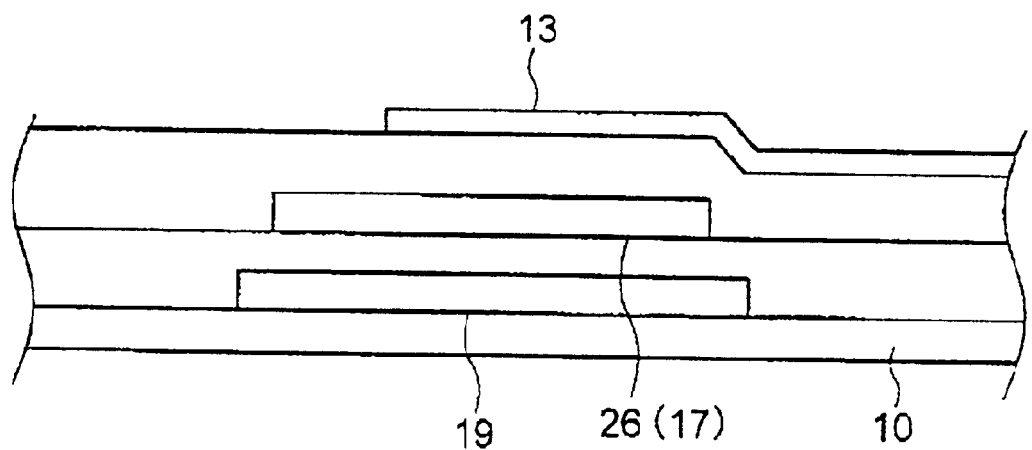
FIGS. 6A to 6D are sectional views taken along lines A—A, B—B, C—C and D—D in FIG. 5.

As shown in FIG. 6A, the large width expansion 19 overlaps and extends along with an edge portion of the pixel electrode 13 and a large width expansion 26 of the shield ring 17 at the location which is far from the TFT 12.

Figure 6B:
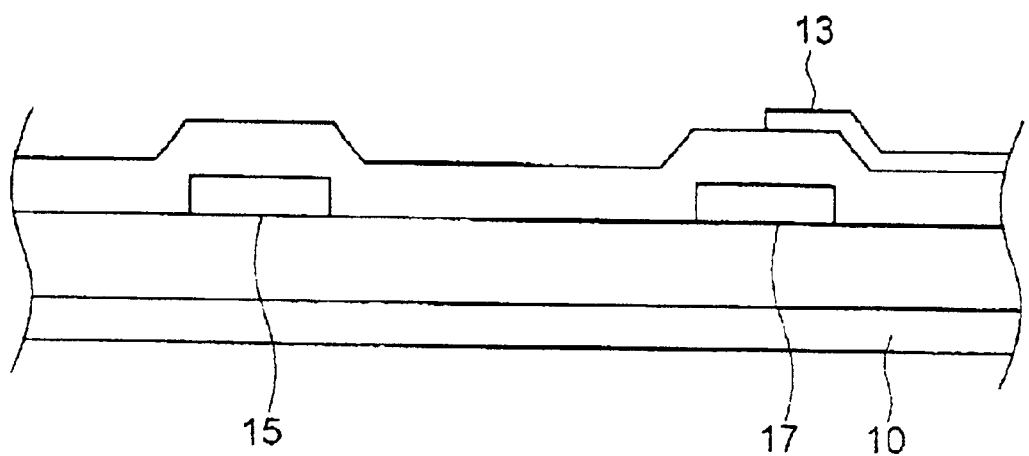
Figure 6C:
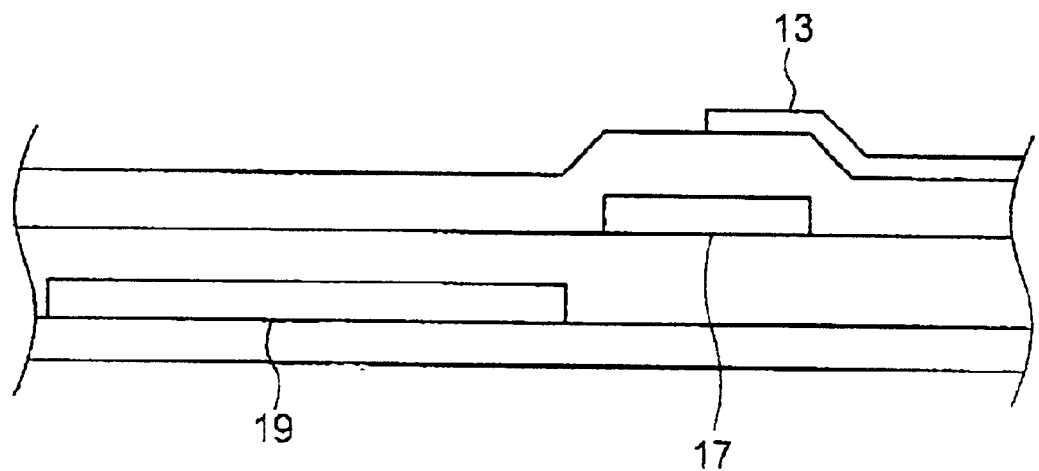
Figure 6D:
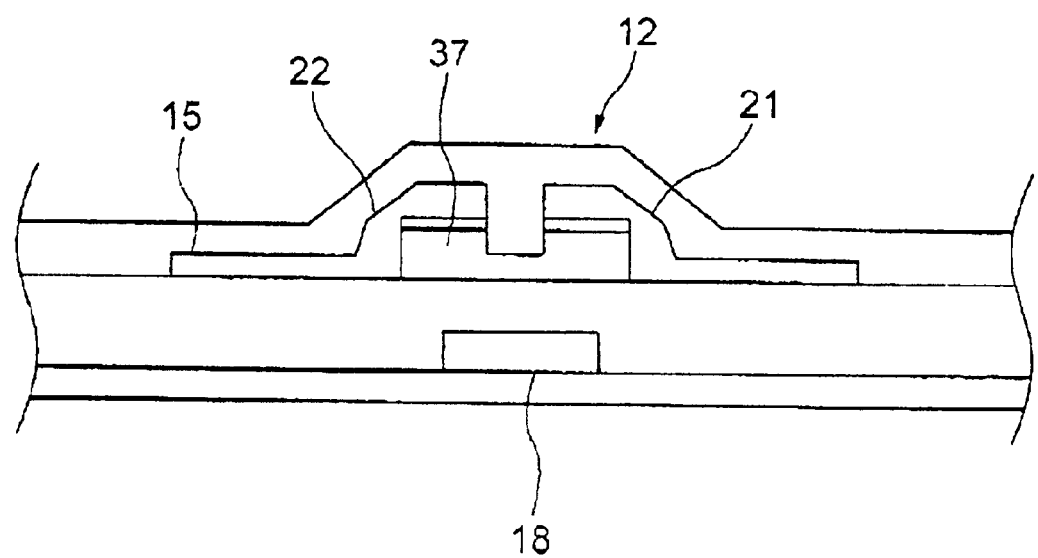

As shown in FIG. 6B, the data line 15 and the shield ring 17 are formed as common layer and extend parallel to each other. As shown in FIG. 6C, the large width expansion 19 of the scanning line 14 is disposed outside the area of a corresponding pixel 11. As shown in FIG. 6D, the TET 12 has the gate electrode 18 and overlying source/drain regions 37 made of amorphous silicon and connected to the source/drain electrodes 21 and 22, respectively. The shield ring 17 has an inner edge portion overlapping the outer edge portion of the pixel electrode 13.

The counter panel includes a glass substrate and a counter electrode formed thereon to oppose all the pixel electrodes 13. Rear side of the counter panel is provided with a backlight.

In operation of the TFT-LCD device of FIG. 5, a signal voltage is applied between the pixel electrode 13 and the counter electrode by driving the TFT 12 to apply a gray-scale-level voltage across a corresponding portion of the liquid crystal.

More specifically, signal voltages are applied first to the respective data lines 15, and a scanning signal is sequentially applied to one of the scanning lines 14 in synchrony with the signal voltages. The pixel electrode 13 is electrically coupled to the corresponding data line 15 during a scanning period when the scanning signal is applied to the corresponding scanning line 14, whereas the pixel electrode 13 is electrically isolated from the corresponding data line 15 during a hold period when the scanning signal is not applied to the corresponding scanning line 14. Accordingly, the LC capacitor $C_{LC}$ and the storage capacitor $C_{SC}$ are charged with the signal voltage during the scanning period, and then hold the signal voltage during the hold period. The electric charge stored in the LC capacitor and the storage capacitor $C_{SC}$ generates an electric field between the pixel electrode 13 and the counter electrode, thereby controlling the transparency of the LC layer with respect to the backlight for display of image.

The storage capacitor $C_{SC}$ has a function for suppressing a reduction of the signal voltage between the pixel electrode 13 and the counter electrode, the reduction being caused by the source-drain leakage current of the TFT 12.

The feed-through voltage Vfd of the TFT-LCD device is generally affected by the gate-source parasitic capacitance $C_{GS}$, the LC capacitance $C_{LC}$, the storage capacitance $C_{SC}$, the gate-pixel electrode parasitic capacitance Cgpi and drain-pixel electrode parasitic capacitance Cdpi. In the present invention, these capacitances except for the LC capacitance $C_{LC}$ are formed substantially between the drain layer (or second conductive layer) and the gate layer (or first conductive layer), because the shield ring 17 maintained at the same potential as the pixel electrode 13 extends along the periphery of the pixel electrode 13 in the space between the pixel electrode 13 and the other patterns.

The pixel electrode 13 made of transparent conductive film, such as ITO film, has a poor patterning accuracy compared to the data lines (drain layer), scanning lines (gate layer) and associated electrodes, which are generally made of metals or alloys. The ITO film used for the pixel electrode 13 is a metal oxide, which is generally hard to etch, and in addition, may have different concentrations of indium and tin in the pixel electrodes within the display area. The latter fact varies the etching rate within the display area and thus causes variance in the dimensions of the pixel electrode 13.

The variance in the dimensions of the pixel electrodes 13 within the display area generally causes variance in the parasitic capacitances between the pixel electrode 13 and the other patterns.

In the present embodiment, the shield ring 17 acting as an electrostatic shield ring far dominates the pixel electrode 13 with respect to the capability of forming parasitic capacitances in association with the first and second conductive layers. In addition, a misalignment such as encountered between the pixel electrode 13 and the data line does not arise between the shield ring 17 and the data line 15 because the shield ring 17 and the data line 15 are formed in one metallic layer, The shield ring 17 has an accurate pattern and thus reduces the variance in the parasitic capacitances which affect the feed-through voltage.

The reduced variations in the feed-through voltage provides a uniform image on the display panel of the TFT-LCD device.

Figure 7:
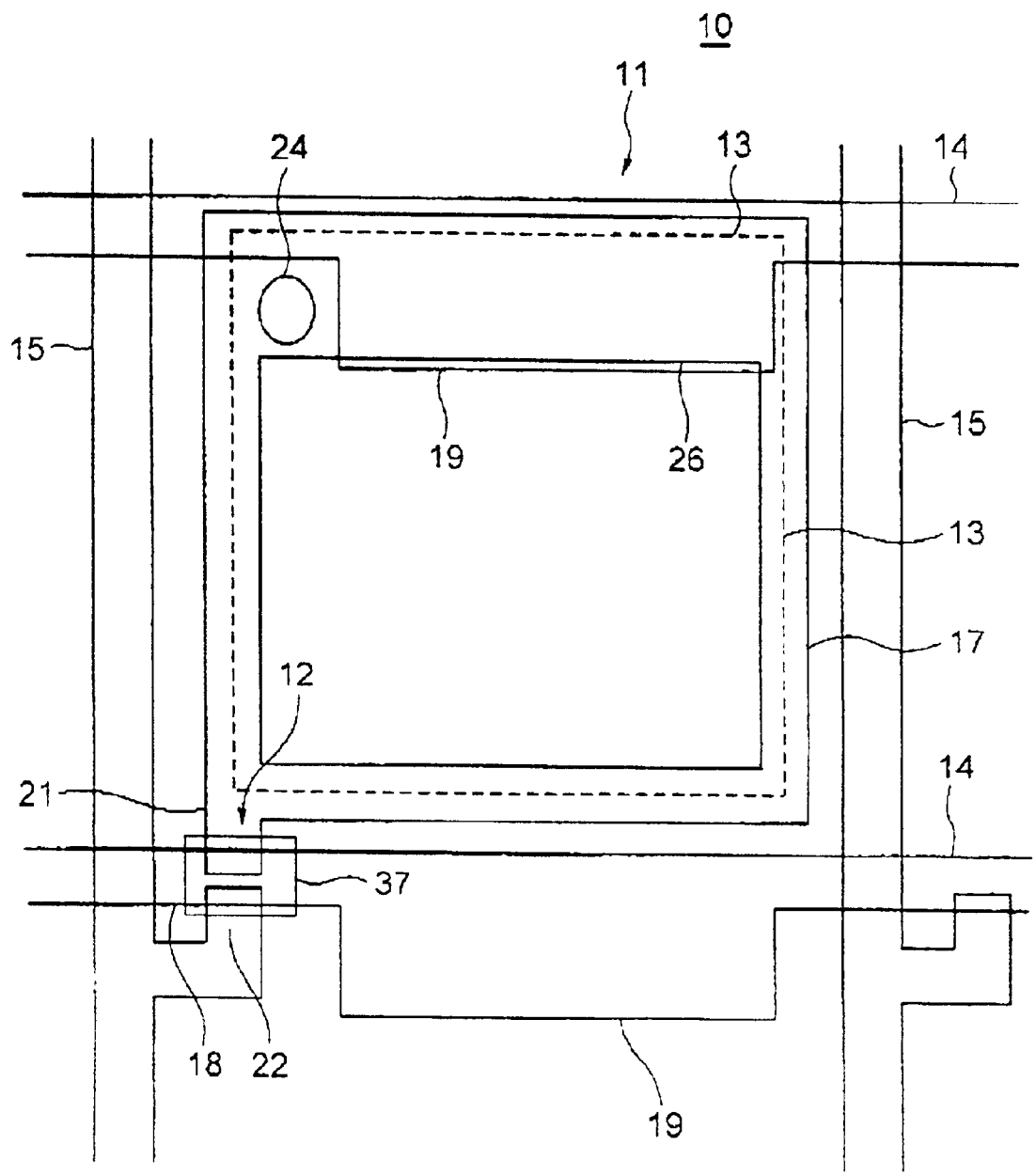
FIG. 7 is a top plan view of a TFT panel for showing a pixel of a TFT-LCD device according to a second embodiment of the present invention.

Referring to FIG. 7, a TFT-LCD device according to a second embodiment of the present invention is similar to the first embodiment except for the structures of the TFT 12 and the through-hole 24. The TFT 12 has a channel region extending perpendicular to the scanning line 14 and a gate electrode formed as a part of the scanning line 14, in the present embodiment. The drain electrode 22 of the TFT 12 extends from the data line 15 to form an "L"-shape stripe, whereas the source electrode 21 of the TFT 12 extends from the shield ring 17. The through-hole 24 connects the pixel electrode 13 and the large width portion 26 of the shield ring 17 in the vicinity of the area for the large width expansion 19 of the adjacent scanning line 14 and far from the TFT 12.

Figure 8:
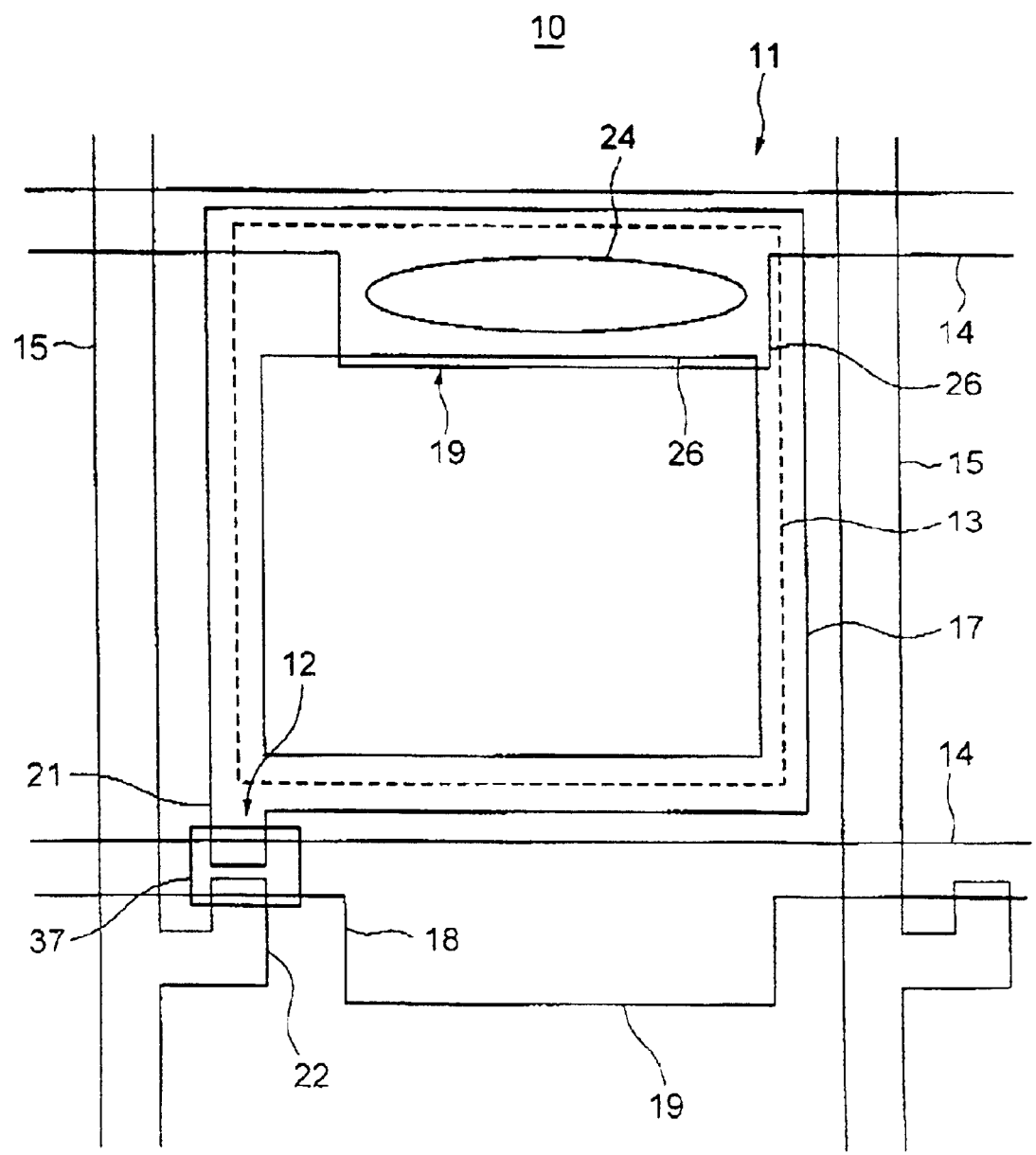
FIG. 8 is a top plan view of a TFT panel for showing a pixel of of a TFT-LCD device according to a third embodiment of the present invention.

Referring to FIG. 8, a TFT-LCD device according to a third embodiment of the present invention is similar to the second embodiment except for the through-hole 24 which connects the pixel electrode 13 and the large width portion 26 of the shield ring 17 inside the area for the large width expansion 19 of the scanning line 14. The second and third embodiments have an advantage of a large effective pixel area for image display.

Figure 9:
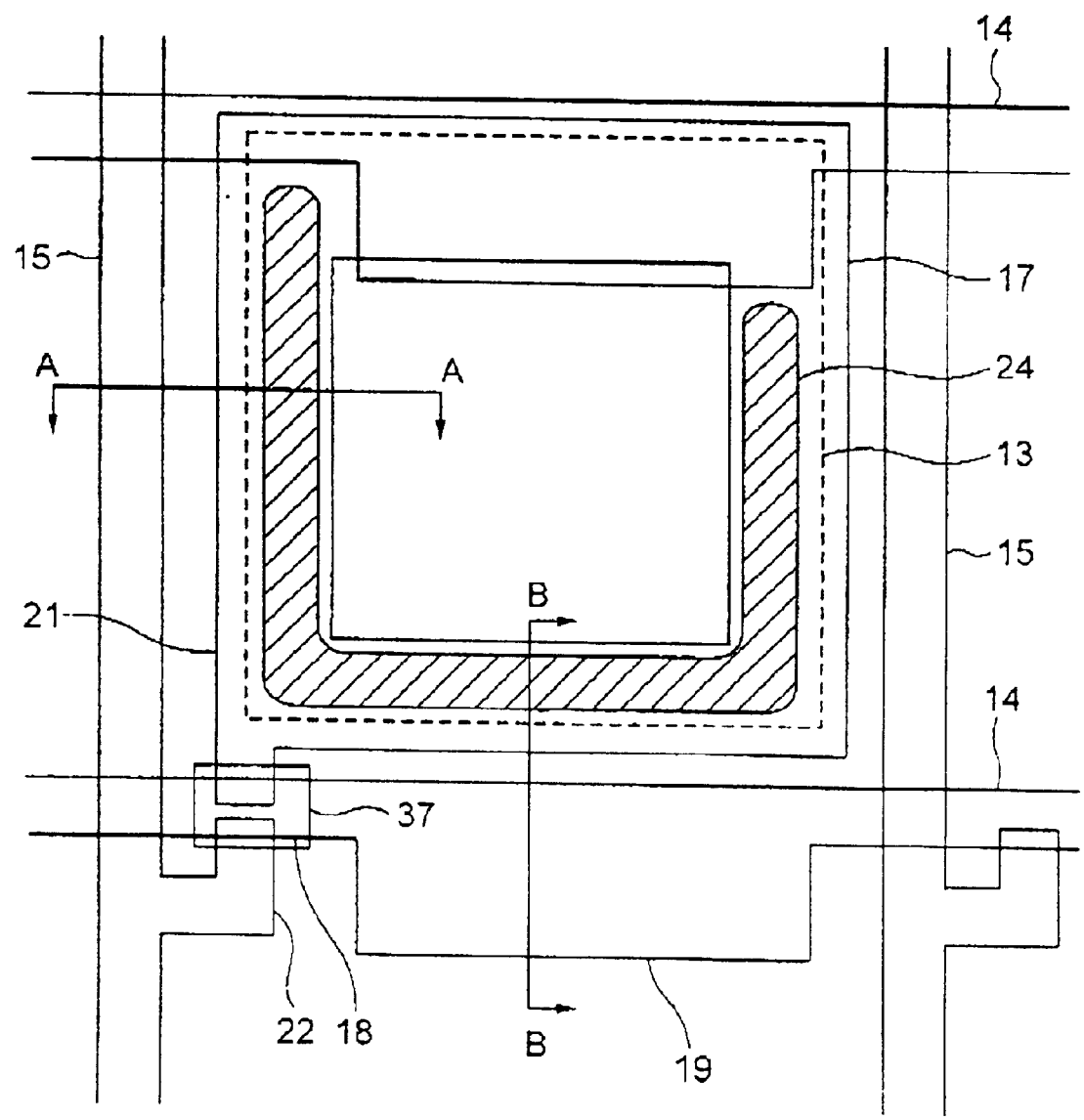
FIG. 9 is a top plan view of a TPT panel for showing a pixel of a TFT-LCD device according to a fourth embodiment of the present invention.

Referring to FIG. 9, a TFT-LCD device according to a fourth embodiment of the present invention has an elongate through-hole 24 shown by a hatched area, where the pixel electrode 13 overlaps with the shield ring 17 as viewed in the direction perpendicular to the TFT panel 10. The elongate through-hole 24 may be replaced by a plurality of through-holes 24 formed in the hatched area 24.

Figure 10A:
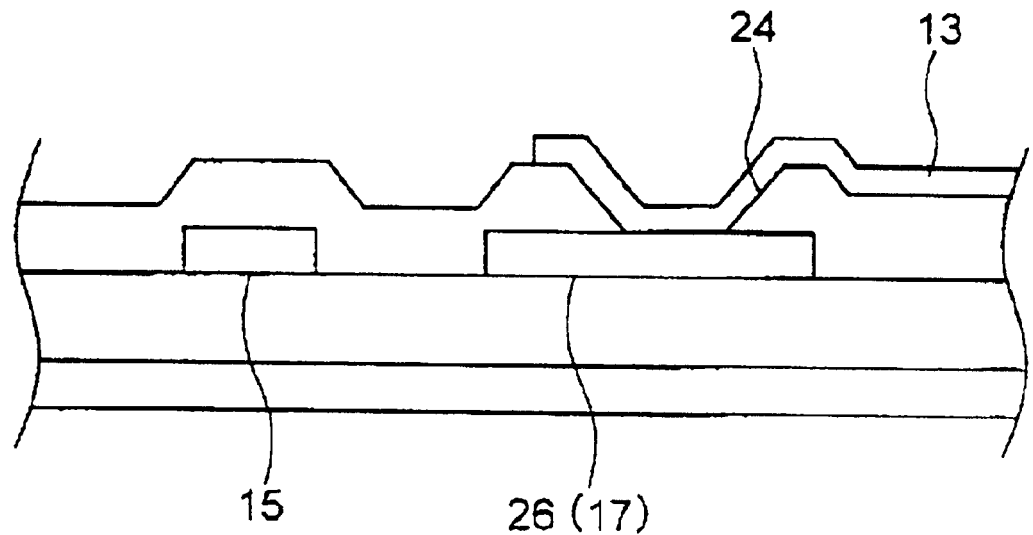
FIGS. 10A and 10B are sectional views taken along lines A—A and B—B in FIG. 9.
Figure 10B:
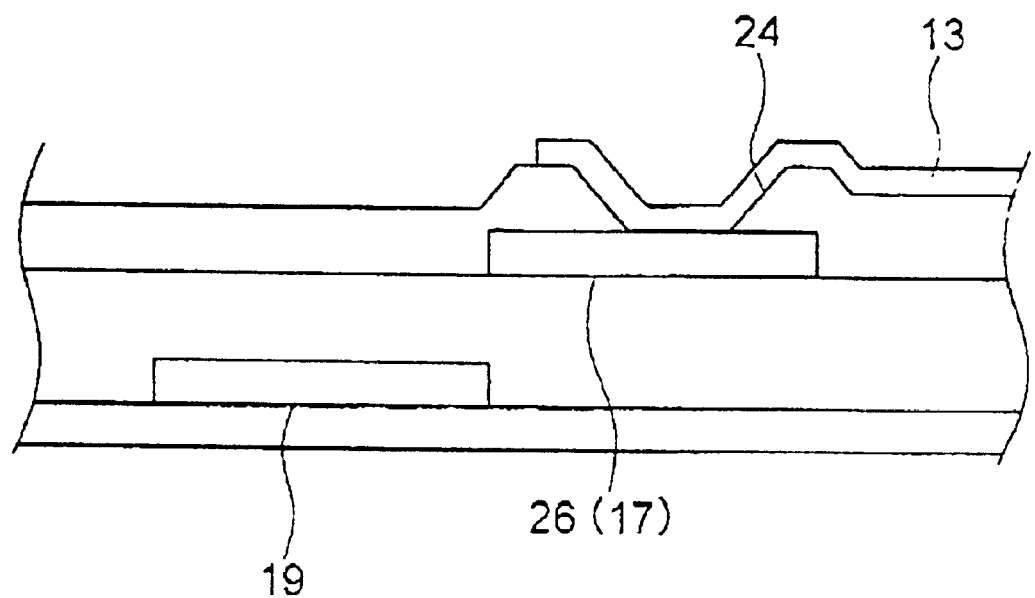

Referring to FIGS. 10A and 10B taken along lines A—A and B—B, respectively, in FIG. 9, the pixel electrode 13 is formed on a large width expansion 26 of the shield ring 17 exposed from the through-hole 24.

Figure 11:
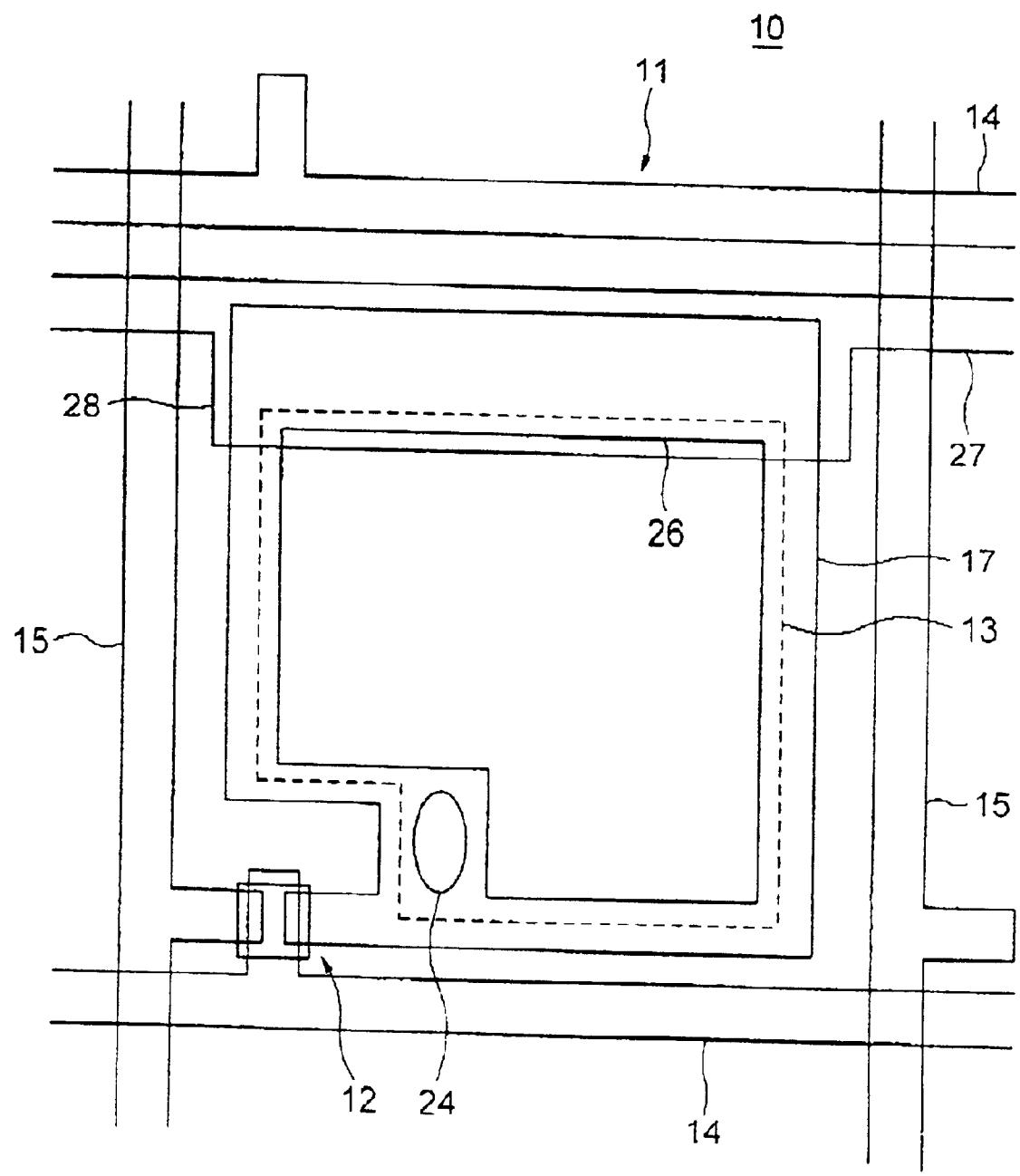
FIG. 11 is a top plan view of a TFT panel for showing a pixel of a TFT-LCD device according to a fifth embodiment of the present invention.

Referring to FIG. 11, a TFT-LCD device according to a fifth embodiment of the present invention is similar to the first embodiment except that a common line 27 extends separately from and parallel to the scanning line 14, and the common line 24 has a large width expansion 28 in the present embodiment. The scanning line 14 has no large width expansion 19 instead. The common lines 27 are maintained at a ground potential.

Figure 12:
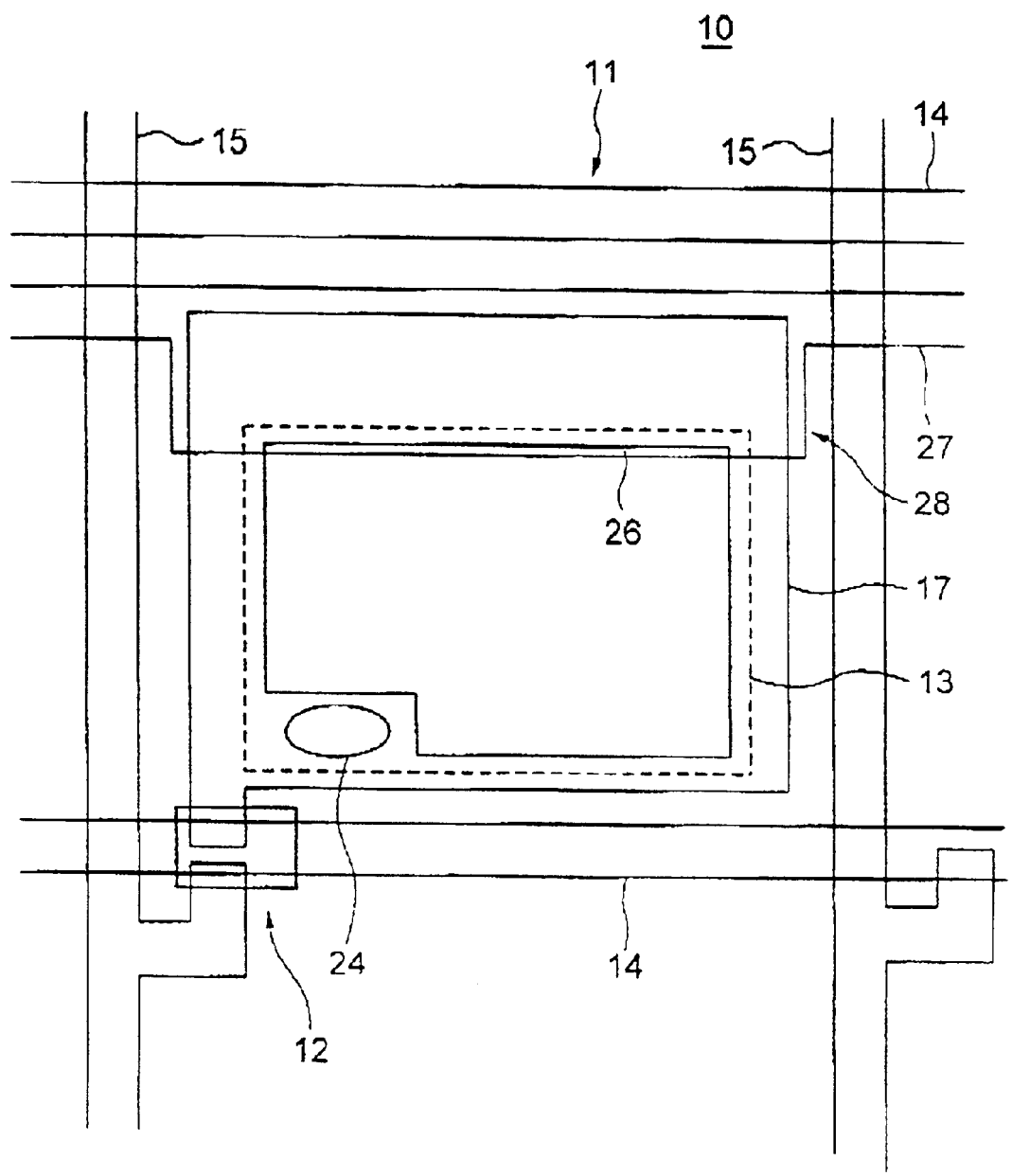
FIG. 12 is a top plan view of a TFT panel for showing a pixel of a TFT-LCD device according to a sixth embodiment of the present invention.

Referring to FIG. 12, a TFT-LCD device according to a sixth embodiment of the present invention is similar to the fifth embodiment except that the TFT is of a longitudinal type and has a channel region extending perpendicular to the scanning line 14.

Figure 13:
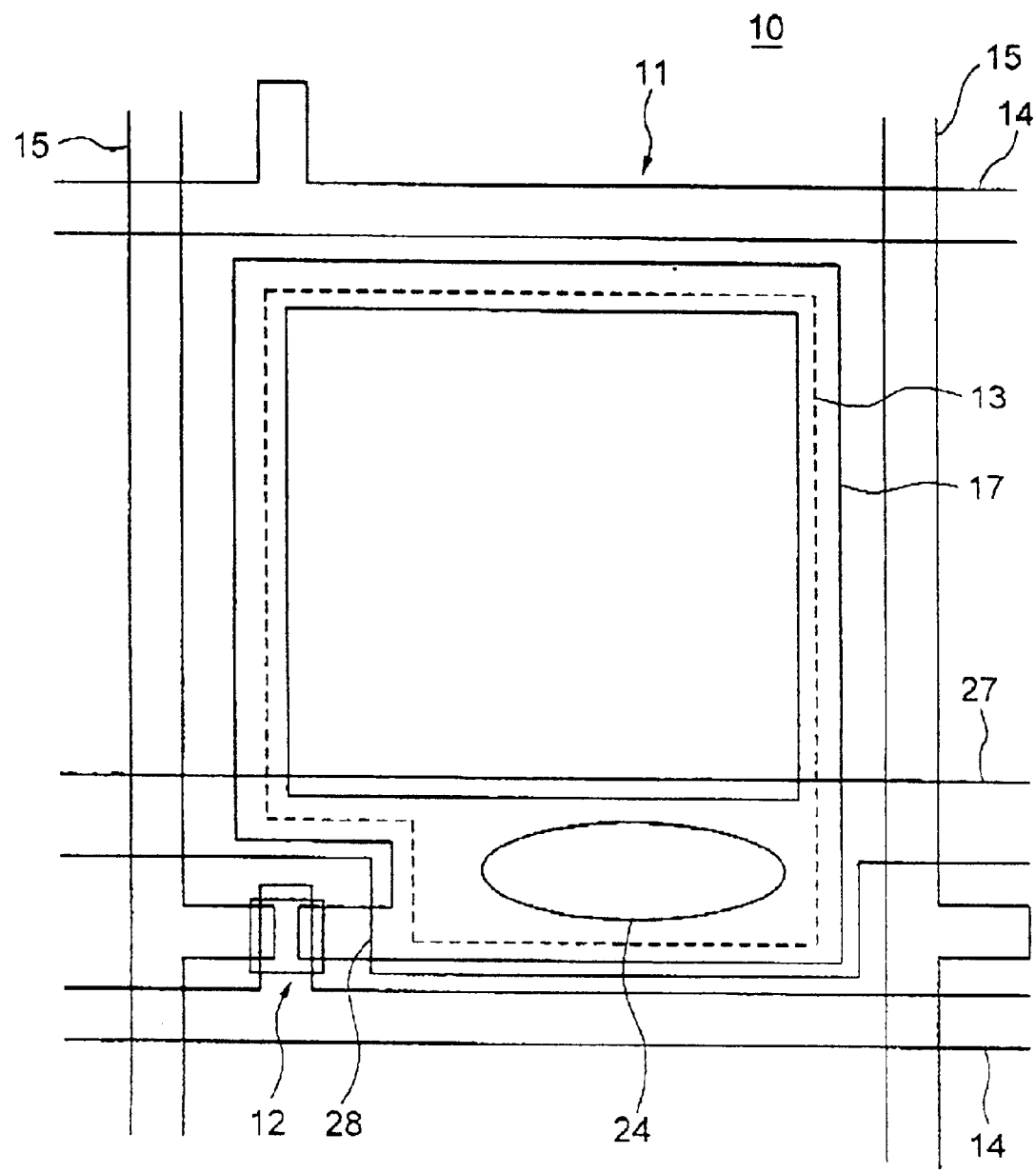
FIG. 13 is a top plan view of a TFT panel for showing a pixel of a TFT-LCD device according to a seventh embodiment of the present invention.

Referring to FIG. 13, a TFT-LCD device according to a seventh embodiment of the present invention is similar to the sixth embodiment except that the common line 27 has a large width expansion 28 adjacent to the TFT 12. A through-hole 24 connects the pixel electrode 13 and the large width expansion 26 of the shield ring 17 in the area for the large width expansion 28 of the common line 27.

Figure 14:
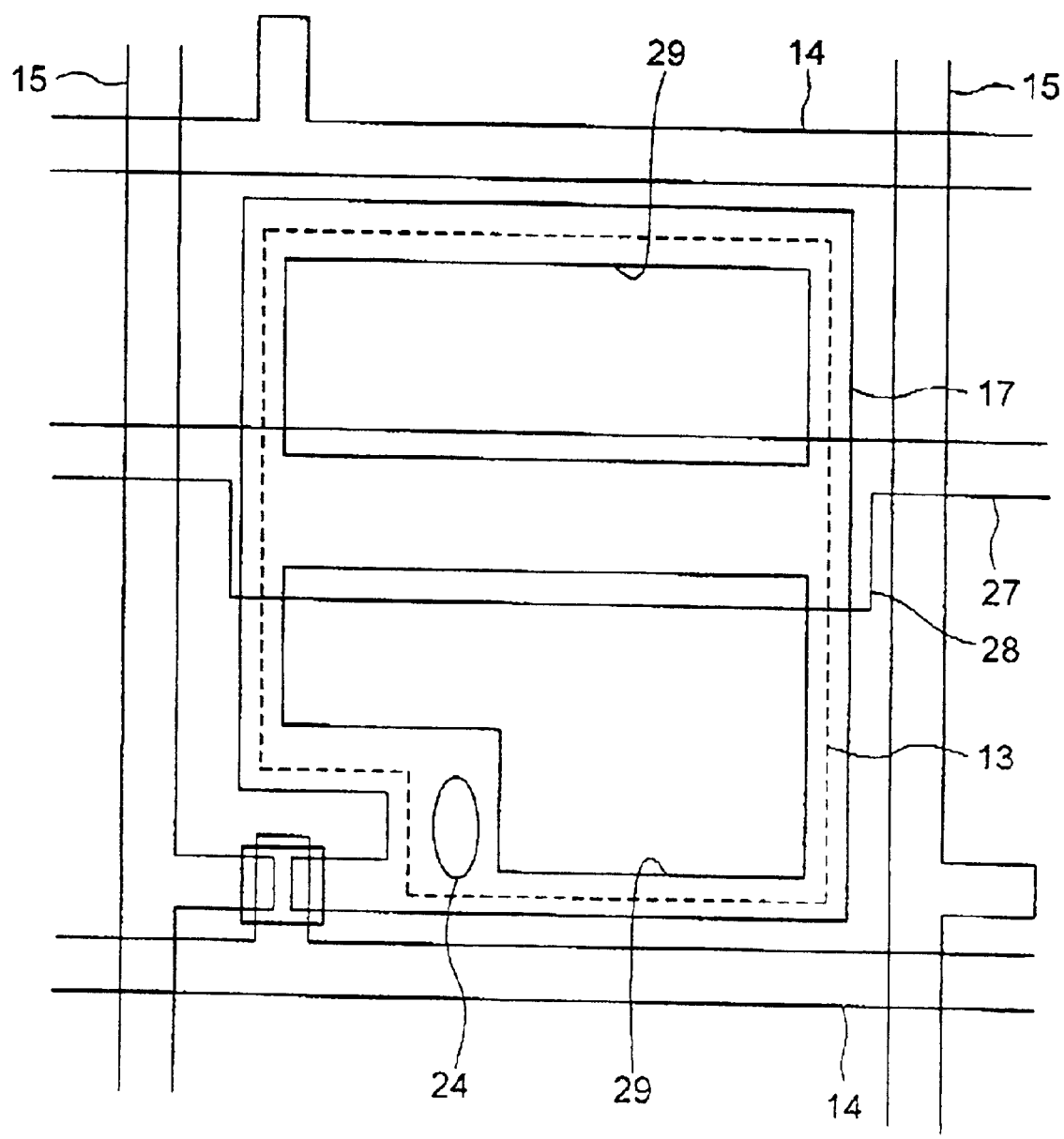
FIG. 14 is a top plan view of a TFT panel for showing a pixel of a TFT-LCD device according to an eighth embodiment of the present invention.

Referring to FIG. 14, a TFT-LCD device according to an eighth embodiment of the present invention is similar to the seventh embodiment except that the common line 27 crosses the pixels 11 at the central portions thereof, the shield ring 17 is of a flat plate having a pair of openings 29 within the area for the pixel electrode 13 and outside the area for the common lines 27, and the through-hole 24 for connecting the pixel electrode 13 and the shield ring 17 is disposed in the vicinity of the TFT 12.

As described above, variance in the feed-through voltage generally depends on the variance in the patterns forming the parasitic capacitances. The patterns forming the parasitic capacitances in the above embodiments have higher patterning accuracy than those in the conventional LCD device. Thus, the variance in the feed-through voltage can be significantly reduced for achieving a higher display performance.

In the above embodiment, the shield ring is exemplified as a shield member. However, the shield member may have a cut out formed in the shield ring or may have a U-shape, so long as the shied member has a significant shield function for the pixel electrode.

Since the above embodiments are described only for examples, the present invention is not limited to the above embodiments and various modifications or alterations can be easily made therefrom by those skilled in the art without departing from the scope of the present invention.

What is claimed is:

1. A thin-film-transistor liquid-crystal-display (TFT-LCD) device comprising a plurality of pixels arranged in an array and each including a TFT and an associated pixel electrode made of a transparent material, a plurality of scanning lines each disposed for a row of said pixels for activating said TFTs in said pixels arranged in the corresponding row, a plurality of data lines each disposed for a column of said pixels for supplying data signals via said TFTs to said pixel electrodes in said pixels arranged in the corresponding column, wherein each of said pixels further includes a shield member made of a conductive material, electrically connected to said pixel electrode and extending along an entirety of a periphery of said pixel electrode, and further comprising a plurality of common lines each extending parallel to and adjacent to one of said scanning lines, each of said common lines having an increased width projection, wherein each of said common lines crosses said pixels arranged in a corresponding row at central portions of said pixels, said central portions being centrally located between adjacent ones of said plurality of scanning lines.

* * * * *